(12) United States Patent
Heichel et al.

(10) Patent No.: US 8,350,428 B2
(45) Date of Patent: Jan. 8, 2013

(54) ROTATION DRIVE

(75) Inventors: Christian Heichel, Niedernberg (DE); Albrecht Kleibl, Schaafsheim (DE)

(73) Assignee: ABI Anlagentechnik-Baumaschinen-Industriebedarf Maschinenfabrik und Vertriebsgesellschaft mbH, Niedernberg (DE)

( * ) Notice: Subject to any disclaimer, the term of this patent is extended or adjusted under 35 U.S.C. 154(b) by 661 days.

(21) Appl. No.: 12/587,849

(22) Filed: Oct. 14, 2009

(65) Prior Publication Data
US 2010/0107788 A1    May 6, 2010

(30) Foreign Application Priority Data
Nov. 6, 2008    (EP) ................................. 08019411

(51) Int. Cl.
*H02K 23/60* (2006.01)
*H02K 7/116* (2006.01)
*B06B 1/16* (2006.01)
*B01F 11/00* (2006.01)

(52) U.S. Cl. ..... 310/113; 310/114; 310/75 D; 310/75 R; 366/128

(58) Field of Classification Search .......... 310/112–115; 475/149
See application file for complete search history.

(56) References Cited

U.S. PATENT DOCUMENTS

| 4,260,919 A | 4/1981 | Fleming |
| 5,417,186 A | 5/1995 | Elrod et al. |
| 6,183,317 B1 * | 2/2001 | Schafer .............................. 440/6 |
| 6,358,173 B1 | 3/2002 | Klemen et al. |
| 7,063,637 B2 * | 6/2006 | Yamauchi et al. ................ 475/5 |
| 7,598,640 B2 * | 10/2009 | Heichel et al. .................. 310/81 |
| 8,070,352 B2 | 12/2011 | Heichel et al. |

FOREIGN PATENT DOCUMENTS

| DE | 196 39 790 | 4/1998 |
| DE | 299 20 093 | 3/2000 |
| DE | 20 2007 003 532 | 7/2007 |
| DE | 20 2007 005 283 | 7/2007 |
| DE | 20 2007 006 283 | 12/2007 |
| FR | 2 419 115 | 10/1979 |
| GB | 2 017 863 | 10/1979 |
| JP | 2007-131295 | 5/2007 |
| WO | WO 90/12223 | 10/1990 |

OTHER PUBLICATIONS

European Search Report dated Sep. 30, 2009 in European Application No. EP 08 01 9411 with English translation of relevant parts.

* cited by examiner

*Primary Examiner* — Burton Mullins
(74) *Attorney, Agent, or Firm* — Collard & Roe, P.C.

(57) ABSTRACT

A tubular drive has a hollow shaft and at least one drive wheel mounted on the hollow shaft so as to rotate. The hollow shaft is rotatably mounted in a flange. An electric motor with an integrated generator is supplied for relative rotational adjustment of the drive wheel on the hollow shaft. A vibration exciter, particularly for a vibration pile driver, has at least two axles disposed parallel to one another, as well as at least two imbalance masses, which are attached on one or more of the axles. There is at least one such tubular drive for adjusting the relative rotation position of the imbalance masses with regard to one another.

10 Claims, 4 Drawing Sheets

ROTATION DRIVE

CROSS REFERENCE TO RELATED APPLICATIONS

Applicants claim priority under 35 U.S.C. 119 of European Application No. 08019411.1 filed Nov. 6, 2008.

BACKGROUND OF THE INVENTION

1. Field of the Invention

The invention relates to a rotation drive and a vibration exciter.

2. The Prior Art

In construction, vibration generators such as vibrators, shakers, or vibration bears, are used to introduce profiles into the ground, or to draw them from the ground, or also to compact ground material. The ground is excited by means of vibration, and thereby achieves a "pseudo-fluid" state. The friction between the goods to be driven in and the ground is reduced as the result of the vibration; the forward drive direction is determined by static top loads. The vibration results from the centrifugal forces of rotating imbalances that run in pairs, within the vibrator drive. Vibration generators are characterized by the effective imbalance (called "static moment" in the field of technology) and the maximal speed of rotation.

For different applications, and in order to achieve an optimal forward drive, i.e. good compaction, as a function of the goods being driven and the ground properties, it is necessary to adjust the size of the effective imbalance. German Patent Application No. DE 20 2007 006 283 U1 describes a vibration exciter in which the effective imbalance and thus the vibration can be adjusted by way of a swivel motor. In this connection, three imbalances are affixed on every imbalance shaft. The middle one of these imbalances corresponds to the sum of the two outer ones. For an adjustment, the middle imbalances are rotated relative to the other ones, step by step, by up to 180 degrees. The swivel motor, which rotates along as a shaft and stands in engagement with the other gear mechanism components by way of two gear wheels, serves to adjust the middle imbalance relative to the others. One of the gear wheels is mounted on the shaft of the swivel motor, and another is mounted on the housing.

It is a disadvantage of the previously known swivel device for adjusting the static moment that in order to supply the swivel motor with hydraulic oil, line passages are required, which are complicated to produce and are subject to wear.

SUMMARY OF THE INVENTION

It is therefore an object of the invention to provide a swivel device for adjusting the static moment in a vibration generator, which does not require any supply lines from the outside. According to the invention, this task is accomplished by means of a rotation drive comprising a hollow shaft and at least one drive wheel mounted on the hollow shaft so as to rotate. The hollow shaft is rotatably mounted in a flange. There are means for relative rotational adjustment of the drive wheel on the hollow shaft, which comprise an electric motor that is supplied by way of an integrated generator.

With the invention, a swivel device for adjusting the static moment in a vibration generator is created, which does not require any supply lines from the outside. Feed of the electric motor takes place by way of an integrated generator; electrical feed lines from the outside are not necessary.

In a further development of the invention, the electric motor comprises a rotor disposed on a motor shaft, which is mounted so as to rotate within the hollow shaft, and a stator disposed on the inside wall of the hollow shaft. In this way, a compact construction is achieved.

In an embodiment of the invention, the motor shaft is connected with a gear mechanism by way of which the drive wheel can be rotated relative to the hollow shaft. In this way, a reduction in the torque that must be produced by the electric motor is brought about.

Preferably, the gear mechanism is a planetary gear mechanism, particularly an eccentric gear mechanism such as an eccentric disk gear mechanism or harmonic drive. In this way, a compressed construction is achieved.

In a further development of the invention, the generator comprises a generator rotor disposed on the hollow shaft, and a generator stator disposed within the flange. In this way, a compact construction of the generator is achieved.

It is advantageous if means for locking the motor shaft in place with the hollow shaft are provided. In this way, incorrect rotation of the shaft ends of the motor shaft during operation is counteracted. Preferably, the means for locking in place are structured to be rest-activated. It is advantageous if the means for locking in place are formed by a spring pressure disk brake. It is advantageous if the disk brake is configured to be electromagnetically releasable. Preferably, a motor control is disposed that is coupled with the means for locking in place.

The invention also comprises a vibration exciter having a swivel device for adjusting the static moment, which does not require any supply lines from the outside. According to the invention, the vibration exciter comprises at least two axles disposed parallel to one another, as well as at least two imbalance masses, which are attached on one or more of the axles. A tubular drive as described above adjusts the relative rotation position of the imbalance masses with regard to one another.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 3:
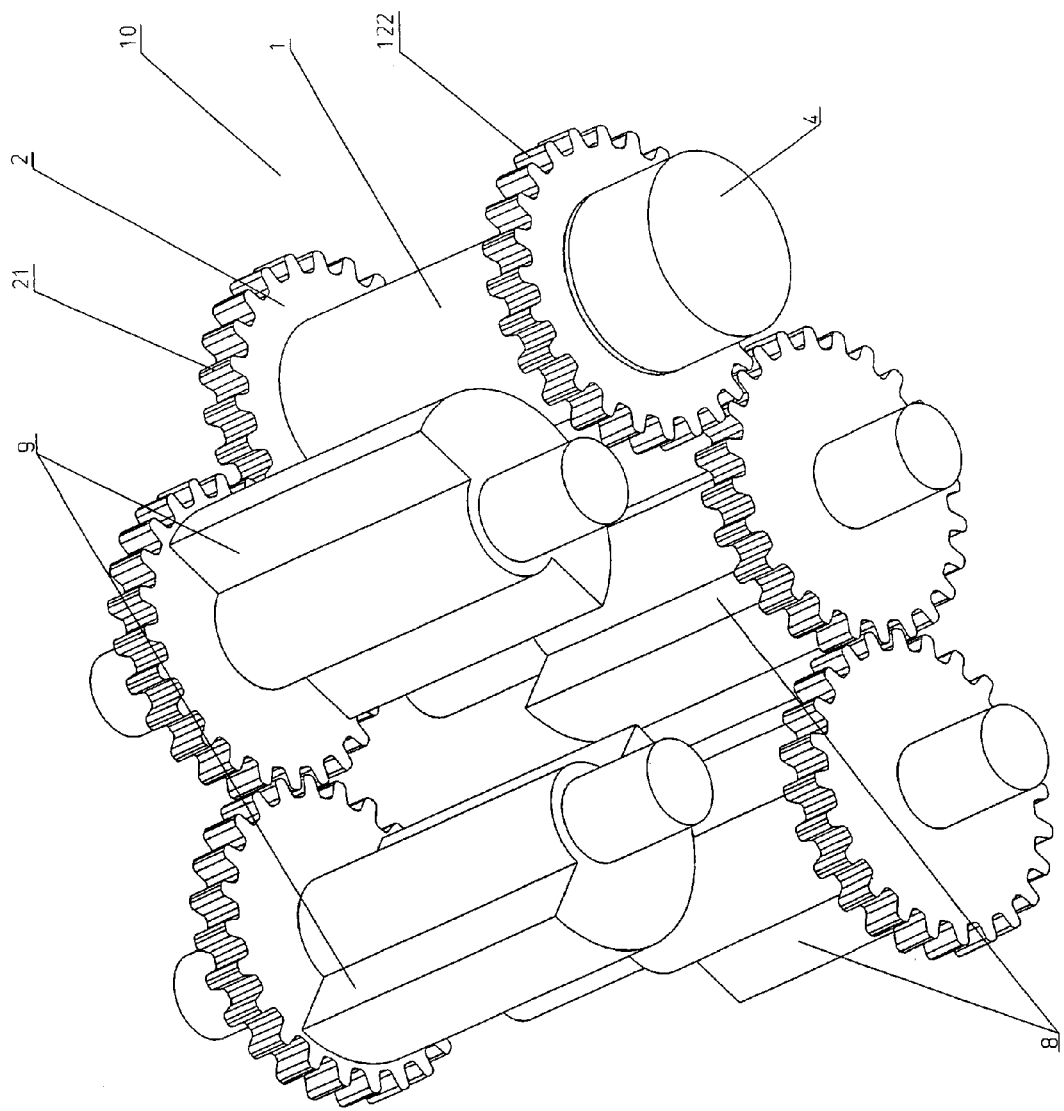
FIG. 3 shows a representation of a vibration generator having an adjustable static moment.

Referring now in detail to the drawings, the rotation drive selected as an exemplary embodiment comprises a hollow shaft 1, which accommodates a drive wheel 2 mounted so as to rotate, and in which a motor shaft 3 is mounted so as to rotate, ending in a flange 4 and connected with the drive wheel 2 by means of a gear mechanism 5. Furthermore, a housing 6 for accommodating hollow shaft 1 is disposed. Hollow shaft 1 is connected by way of gears 21 and 122 to a plurality of axles 8 having imbalance masses 9, to form a vibration generator, as shown in FIG. 3.

Hollow shaft 1 is structured in three parts. It consists of an end piece 11, a center piece 12, and an end piece 13. End piece 11 is configured essentially as a hollow cylinder. At its end facing center piece 12, a connection flange 111 is formed onto end piece 11. Furthermore, end piece 11 is provided with bearing seats 112 for accommodating slide bearings 72. End piece 11 is connected with center piece 12 by way of screw connections. Center piece 12 is configured as a rotation-symmetrical hollow body. On its side facing end piece 11, a connection flange 121 for connecting to end piece 11 is formed onto middle piece 12. The connection flange 121 has an outer gearing 122 on the circumference. On its end facing away from end piece 11, center piece 12 is provided with a bearing seat 123 for accommodating a slide bearing 71 and with bores 124 for accommodating support pins 14. Center piece 12 is connected with end piece 13 by way of support pins 14. End piece 13 is configured in the manner of a flange and has bores 132 for accommodating support pins 14. Furthermore, bearing seats 131 for accommodating slide bearings 72 for mounting motor shaft 3 and the drive wheel 2 are provided. On its end facing away from center piece 12, a bearing seat 133 for accommodating a radial bearing 71 is disposed on the outside of end piece 13, by way of which bearing end piece 13 is mounted in housing 6.

Drive wheel 2 is configured as a rotation-symmetrical hollow body whose inside contour corresponds, to a great extent, to the outside contour of center piece 12 in the region of center piece 12. At its end facing end piece 11, drive wheel 2 is provided with an outside gearing 21. At its end that lies opposite outside gearing 21, drive wheel 2 is provided with an inside gearing 22. Inside gearing 22 is configured as a cycloid gearing and serves to engage outside gearing 511 of eccentric disks 51.

In the exemplary embodiment, motor shaft 3 is configured in multiple steps. Subsequent to engagement into end piece 11, in which the motor shaft is mounted by way of slide bearings 72, motor shaft 3 makes a transition into a region having a greater diameter, in the region of connection flange 111. In this region, a rotor 31 is affixed to motor shaft 3, which rotor is surrounded by a stator 16, which is disposed on the inside in center piece 12 of hollow shaft 1. Subsequent to rotor 31, motor shaft 3 is once again configured to be larger in diameter, and this is followed by two eccentrically configured steps 32. Eccentric steps 32 accommodate two eccentric disks 51 of gear mechanism 5, which are guided by support pins 14. At its end facing end piece 13, motor shaft 3 is mounted in the end piece 13 so as to rotate, by way of slide bearings 72.

Flange 4 is configured in the shape of a pot. On its inside, flange 4 has bearing seats 41 for accommodating a radial bearing 71. Furthermore, a bearing seat 42 for a slide bearing 72 for mounting the motor shaft 3 is disposed in a centered manner. On its side facing the center piece 12, a stator 43 is affixed in flange 4, running around the inside, which stator surrounds a rotor disposed on end piece 11, running around the outside. Stator 43 and rotor 15 form a generator for supplying power to the electric motor formed by rotor 31 and stator 16.

In the exemplary embodiment, gear mechanism 5 is configured as an eccentric disk gear mechanism having cycloid gearing. It essentially consists of two eccentric disks 51 that are mounted, so as to rotate, on eccentric steps 32 of motor shaft 3, and are guided by support pins 14, and of the part of drive wheel 2 that covers this region. For this purpose, the inside of drive wheel 2 has a corresponding inside gearing 22, which engages outside gearing 511 of eccentric disks 51. With such a gear mechanism, it is possible to implement very large translations in one step. Since multiple teeth are in engagement at all times, and the degree of coverage is very great, large torques can be transferred.

Figure 1:
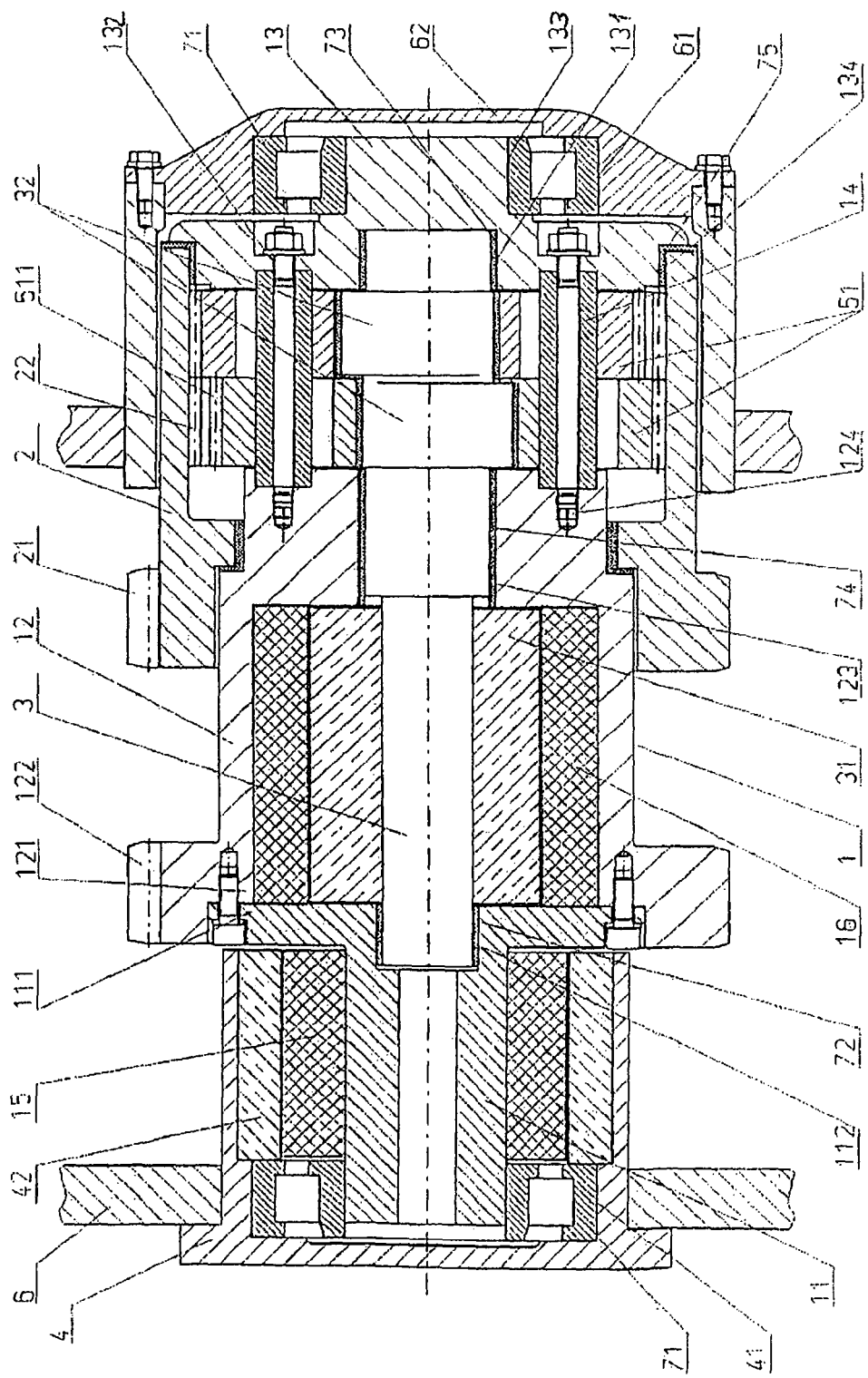
FIG. 1 shows a sectional representation of a rotation drive according to one embodiment of the invention.
Figure 2:
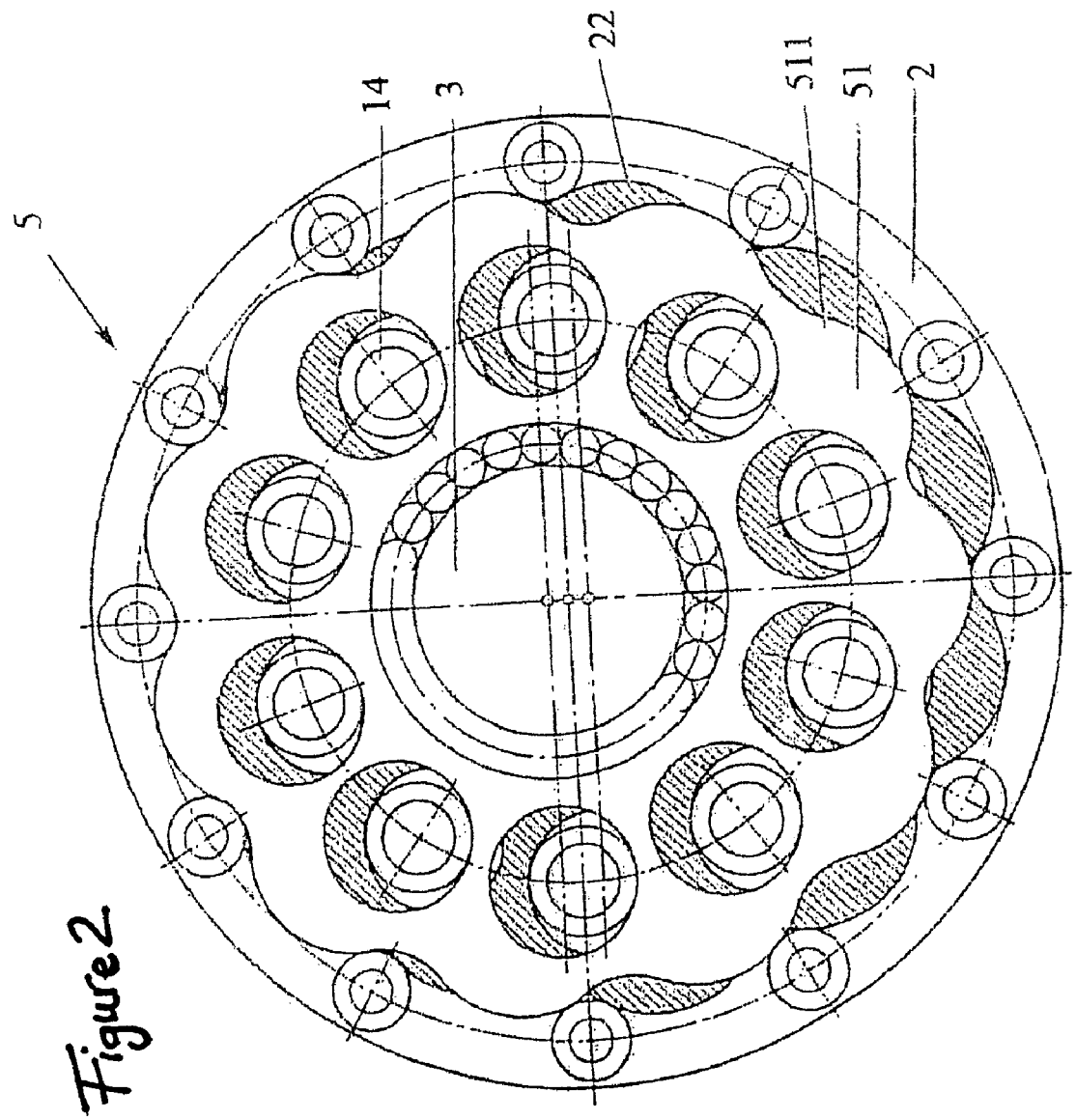
FIG. 2 shows a schematic representation of the eccentric disk gear mechanism of the rotation drive from FIG. 1.

Housing 6 is indicated in FIG. 1. It has a bearing seat 61 for a radial bearing 71 for accommodating the motor shaft 3.

In operation, hollow shaft 1, together with motor shaft 3 mounted in it and drive wheel 2 connected with motor shaft 3 by way of gear mechanism 5, rotates between the flange 4 and the housing 6, within a vibration exciter. In this connection, hollow shaft 1, driven by way of gearing 122, rotates with generator rotor 15, in flange 4, in which the fixed generator stator 43 is attached. The voltage induced in this generator drives the integrated electric motor by way of a contact-free control—not shown. This electric motor consists of motor shaft 3, which is mounted in rotating hollow shaft 1, of motor stator 16, and of motor rotor 31. Motor shaft 3 moves eccentric disks 51, which turn drive wheel 2 relative to hollow shaft 1 at a translation ratio of 1 to 40. Depending on design of the gear mechanism, translation ratios of 1 to 70 and more can also be achieved.

Figure 4:
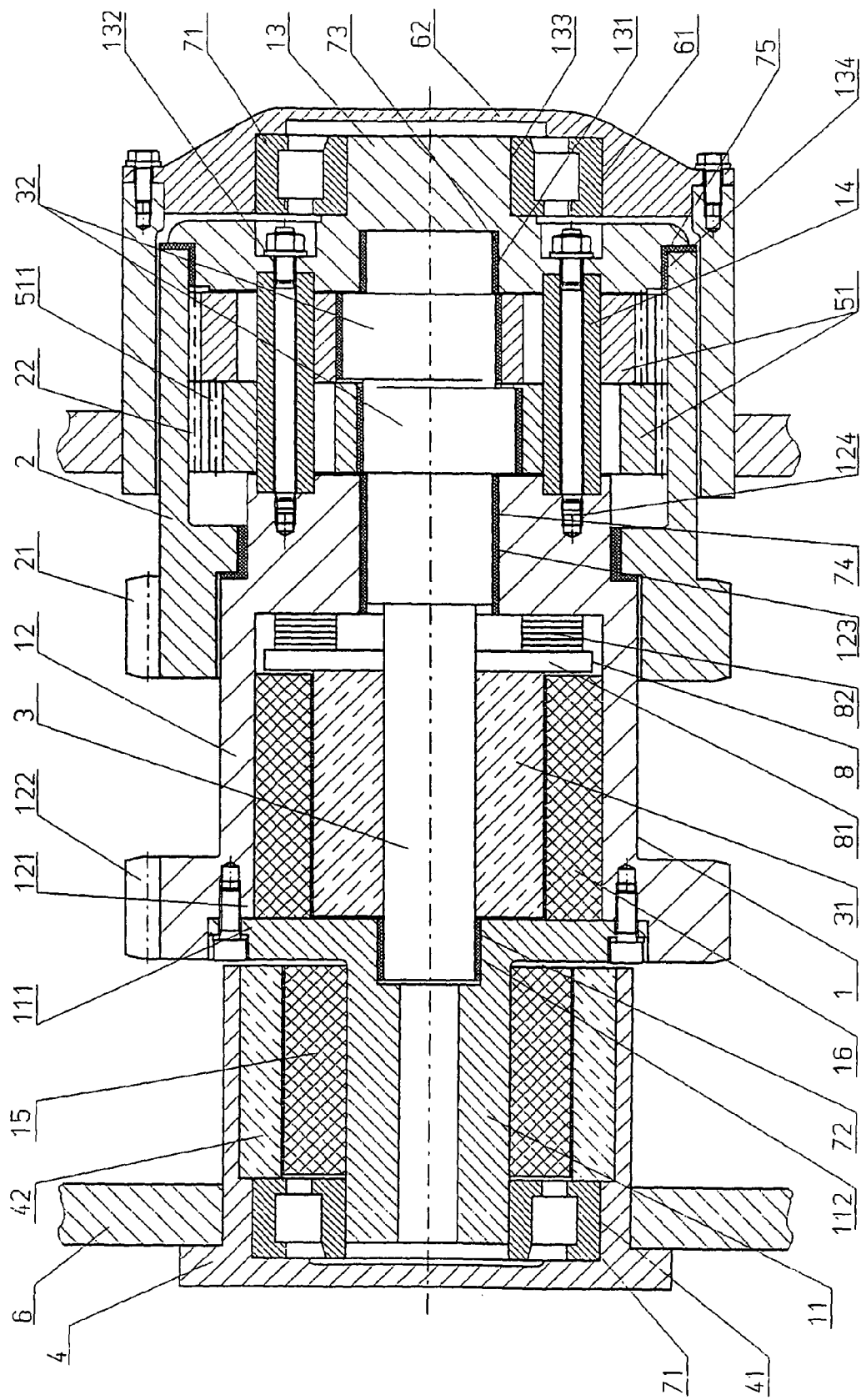
FIG. 4 shows a sectional representation of a rotation drive according to another embodiment of the invention.

As shown in FIG. 4, a clamping device in the form of a spring pressure disk brake 8 can counteract incorrect rotation of the ends of the motor shaft 3 and of hollow shaft 1 that face flange 4. Spring pressure disk brake 8 is formed by a pressure plate 81 and a multiple disk packet 82.

The rotation drive according to the invention solves the statement of task indicated above, but its use is not restricted to vibration exciters. For example, use of the rotation drive according to the invention in a differential gear mechanism is also possible, whereby in this case, the translation of the gear mechanism should be designed at 1 to 1.

Accordingly, while only a few embodiments of the present invention have been shown and described, it is obvious that many changes and modifications may be made thereunto without departing from the spirit and scope of the invention.

What is claimed is:

1. A tubular drive, comprising:
   a hollow shaft rotatably mounted in a flange;
   at least one drive wheel rotatably mounted on the hollow shaft; and
   an electric motor having an integrated generator for relative rotational adjustment of the drive wheel on the hollow shaft, the electric motor comprising a rotor disposed on a motor shaft mounted to rotate within the hollow shaft, and a stator disposed on an inside wall of the hollow shaft.

2. The tubular drive according to claim 1, wherein the motor shaft is connected with a gear mechanism that rotates the drive wheel relative to the hollow shaft.

3. The tubular drive according to claim 2, wherein the gear mechanism is a planetary gear mechanism.

4. The tubular drive according to claim 1, wherein the generator comprises a generator rotor disposed on the hollow shaft and a generator stator disposed within the flange.

5. The tubular drive according to claim 1 further comprising means for locking the motor shaft in place with the hollow shaft.

6. The tubular drive according to claim 5, wherein the means for locking in place comprise a clamping device that is disposed between the hollow shaft and the motor shaft.

7. The tubular drive according to claim 5, wherein the means for locking in place are configured to be rest-activated.

8. The tubular drive according to claim 5, wherein the means for locking in place are formed by a spring pressure disk brake.

9. The tubular drive according to claim 5, further comprising a motor control coupled with the means for locking in place.

10. A vibration exciter, comprising:
at least two axles disposed parallel to one another;
at least two imbalance masses, which are attached on one or more of the axles; and
at least one tubular drive for adjusting the relative rotation position of the imbalance masses with regard to one another, said at least one tubular drive comprising;
a hollow shaft rotatably mounted in a flange;
at least one drive wheel rotatably mounted on the hollow shaft; and
an electric motor formed by an integrated generator for relative rotational adjustment of the drive wheel on the hollow shaft.

\* \* \* \* \*